US010809425B2

(12) United States Patent
Gubela

(10) Patent No.: US 10,809,425 B2
(45) Date of Patent: Oct. 20, 2020

(54) RETROREFLECTOR ELEMENT FOR USE IN ROAD TRAFFIC

(71) Applicant: Hans-Erich Gubela, Kappelrodeck (DE)

(72) Inventor: Hans-Erich Gubela, Kappelrodeck (DE)

( * ) Notice: Subject to any disclaimer, the term of this patent is extended or adjusted under 35 U.S.C. 154(b) by 105 days.

(21) Appl. No.: 16/250,370

(22) Filed: Jan. 17, 2019

(65) Prior Publication Data

US 2019/0226166 A1    Jul. 25, 2019

(30) Foreign Application Priority Data

Jan. 22, 2018  (DE) .................. 10 2018 101 292

(51) Int. Cl.
   *G02B 5/12*  (2006.01)
   *G02B 5/124*  (2006.01)
(52) U.S. Cl.
   CPC .................... *G02B 5/124* (2013.01)
(58) Field of Classification Search
   CPC ........................................... G02B 5/124
   See application file for complete search history.

(56) References Cited

U.S. PATENT DOCUMENTS

| 3,716,445 | A | 2/1973 | Lemelson |
| 3,744,117 | A | 7/1973 | Heenan et al. |
| 3,817,596 | A | 6/1974 | Tanaka |
| 3,873,184 | A | 3/1975 | Heenan |
| 5,189,553 | A | 2/1993 | Smith |
| 5,706,132 | A | 1/1998 | Nestegard et al. |
| 7,135,671 | B2 | 11/2006 | Gubela, Sr. |
| 8,247,263 | B2 | 8/2012 | Braune et al. |
| 10,101,591 | B2 | 10/2018 | Lauret |
| 2006/0007542 | A1 | 1/2006 | Smith |
| 2006/0158736 | A1 | 7/2006 | Bacon, Jr. |
| 2010/0277801 | A1 | 11/2010 | Nakajima |
| 2010/0284080 | A1 | 11/2010 | Mullen |
| 2011/0227238 | A1 | 9/2011 | Mimura et al. |

(Continued)

FOREIGN PATENT DOCUMENTS

| DE | 44 10 994 C2 | 1/1996 |
| DE | 202 07 645 U1 | 10/2002 |

(Continued)

OTHER PUBLICATIONS

Partial European Search Report in EP 18 21 0406, dated May 15, 2019, with English translation of relevant parts.

(Continued)

*Primary Examiner* — Wen Huang
(74) *Attorney, Agent, or Firm* — Collard & Roe, P.C.

(57) ABSTRACT

A retroreflector element is divided into multiple reflection regions. The triples of a first reflection region are designed for the purpose of reflecting incident light beams parallel to the preferred direction, at a narrow angle distribution. The side surfaces of the triples of the first reflection region preferably stand precisely perpendicular on one another. The second reflection region is designed to reflect another part of the incident light falling onto the retroreflection element, independent of the preferred direction, at an observation angle between 0° and 2°. The second reflection region ensures that the retroreflection element remains visible at an observation angle up to at least 2°, even perpendicular to the preferred direction.

14 Claims, 2 Drawing Sheets

(56) References Cited

U.S. PATENT DOCUMENTS

2017/0068022 A1 3/2017 Buoni
2017/0321039 A1 11/2017 Kuhn et al.

FOREIGN PATENT DOCUMENTS

| DE | 696 22 754 T2 | 4/2003 |
| DE | 102 16 579 A1 | 10/2003 |
| DE | 10 2005 009 066 A1 | 9/2006 |
| DE | 10 2012 022 418 A1 | 5/2014 |
| DE | 20 2014 102 938 U1 | 8/2014 |
| DE | 10 2014 212 918 A1 | 1/2016 |
| DE | 10 2014 223 785 A1 | 5/2016 |
| EP | 1 756 632 B1 | 7/2015 |
| EP | 2 927 580 A1 | 10/2015 |
| WO | 2015/145026 A1 | 10/2015 |
| WO | 2017/182171 A1 | 10/2017 |

OTHER PUBLICATIONS

Complete European Search Report dated Aug. 28, 2019 in European Application No. 18210406.7 with English translation of relevant parts.
Partial European Search Report in EP 18 21 0408, dated May 23, 2019, with English translation of relevant parts.
German Search Report in DE 10 2018 101 289.6, dated Sep. 21, 2018, with English translation of relevant parts.
German Search Report in DE 10 2018 101 291.8, dated Sep. 21, 2018, with English translation of relevant parts.
German Search Report in DE 10 2018 101 292.6, dated Sep. 21, 2018, with English translation of relevant parts.
DIN 67 520, Retro-reflecting materials for traffic safety: photometric evaluation, measurement and characterization of retroreflectors and retro-reflecting sheetings, Sep. 1982, 4 pages.
DIN EN 12899-3, Fixed vertical road traffic signs—Part 3: Delineator posts and retroreflectors, Feb. 2008, 28 pages.
P. R. Yoder, Jr., "Study of Light Deviation Errors in Triple Mirrors and Tetrahedral Prisms", Journal of the Optical Society of America, vol. 48, No. 7, Jul. 1958, pp. 496-499.

RETROREFLECTOR ELEMENT FOR USE IN ROAD TRAFFIC

CROSS REFERENCE TO RELATED APPLICATIONS

Applicant claims priority under 35 U.S.C. § 119 of German Application No. 10 2018 101 292.6 filed Jan. 22, 2018, the disclosure of which is incorporated by reference.

BACKGROUND OF THE INVENTION

1. Field of the Invention

The present invention serves to provide retroreflectors for use in road traffic, in particular for marking concrete guide walls at construction sites, which do not just fulfill the reflection requirements at the observation angles required in the standard, but are easily visible at least also at the intermediate angles or under all angle conditions that occur when driving on a multi-lane road, with regard to a retroreflector.

2. Description of the Related Art

Different types of retroreflectors are known. A known type of reflective elements or, stated more precisely, of retroreflective elements is represented, for example, by foils having embedded microbeads, in front of a reflective layer.

In general, reflective elements that comprise one or more Cube Corner elements for retroreflection have a clearly higher degree of retroreflection and therefore a clearly higher degree of effectiveness than such microbead-based foils. Such a Cube Corner ("cube corner") consists, in this regard, of three surfaces that stand essentially perpendicular to one another, and is called a triple. A corresponding retroreflector generally comprises a plurality of such triples, in this regard. Triple structures in turn can be differentiated into structures in which the triples are disposed in the manner of a pyramid, in the form of tetrahedrons, and structures in which a cube corner is completely configured in the material as a Full Cube triple.

Retroreflectors are qualified, according to DIN 67520, using the reflection value or the specific reflection value. In the present application, the reflection value is used. The reflection value is defined as the ratio between the light intensity reflected back in a specific direction by a retroreflector and the illumination intensity impacting the retroreflector. Reference is hereby made to the angles defined in DIN 67520. Furthermore, unless otherwise stated here, the definitions indicated in the cited standards also apply here.

The properties that retroreflectors must have in road traffic are described, in particular, in DIN EN 12899-3, in Section 6.3.2. The standard establishes two observation angles, namely 20' (arc minutes) and 2°, at which retroreflectors must achieve minimum values of specific reflectivity in road traffic.

For example, when approaching a guide wall with a retroreflector at night, in a vehicle, the observation angles are at first very small in the case of a straight roadway, both in the horizontal and in the vertical direction. It is necessary to recognize the course of the road, i.e. of the construction site, even from far away. For this purpose, high reflection values are required at small observation angles. The beam of the headlight should be reflected to itself, if at all possible. When the vehicle approaches the reflector, the observation angle increases, because the vertical distance between the headlight and the eye of a driver remains the same.

SUMMARY OF THE INVENTION

The present invention is based on the object of creating a reflector that can be seen even at observation angles up to at least 2°, independent of a possible rotation of the reflector.

These and other objects are accomplished by a retroreflection element according to one aspect of the invention. For production of a retroreflection element according to the invention, a mold according to another aspect of the invention can be used.

The invention relates to a retroreflection element that comprises an arrangement composed of a plurality of triples, each having three side surfaces that stand almost perpendicular to one another. Almost perpendicular means that the side surfaces enclose an angle between 89° and 91° relative to one another. It is advantageous if geometries in which the triples are configured as complete cube corners are used in a retroreflector element according to the invention. Geometries with pyramidal structures have the disadvantage, as compared with complete cube corners, that the entire surface is not available for retroreflection, and therefore maximally 66% of the incident light is reflected. This reflection percentage leads to a low degree of effectiveness and thereby to lesser freedoms in distributing incident light in a desired direction when reflecting it.

A retroreflection element according to the invention has a preferred direction. In other words, when the retroreflection element is rotated about a center perpendicular line, there is an angle of rotation s at which the reflection values assume a maximum. The angle of rotation can be measured with reference to an orientation of the retroreflector element, in which a main expanse axis of the retroreflector element runs in the vertical direction. It is advantageous that the optimal angle of rotation is 0°, so that the preferred direction runs parallel to a main expanse axis, and both directions run vertically relative to the surroundings. This orientation exists, for example, in the case of installation of a retroreflection element according to the invention on a side surface of a concrete guide wall.

An "observation angle parallel to the preferred direction" is understood to mean a measurement arrangement in which the projection of a straight line that passes through a center point of a light source and a center point of a receiver on a light entry surface of the retroreflector is parallel to the preferred direction. In this regard, the reflection value is measured at the angle that is enclosed between the center point of the light source, the center point of the retroreflector element, and the center point of the receiver. Accordingly, an "observation angle perpendicular to the preferred direction" is understood to mean a measurement arrangement in which the projection of the straight line that passes through the center point of the light source and the center point of the receiver on the light entry surface forms a right angle entry with the preferred direction, and the reflection value is measured as above. An observation angle perpendicular to the preferred direction is assumed, for example, if the retroreflection element is affixed to a foot surface of a concrete guide wall, for example to secure a construction site. In this arrangement, the retroreflector element extends in the horizontal direction, in which the preferred direction then also lies, while an axis between headlight and eye of a driver of an approaching vehicle lies approximately in the vertical direction. Even under these conditions, the retroreflector element according to the invention can still be seen at least up to an observation angle of 2°.

The retroreflector element is divided into multiple reflection regions, according to the invention. The triples of a first reflection region are designed to reflect incident light beams at a narrow angle distribution parallel to the preferred direction. In order to achieve the best possible retroreflection power, even slight deviations of the side surfaces from the right angle are undesirable in the first reflection region. Except for production errors in the range of at most 5', preferably at most 1', the side surfaces of the triples of the first reflection region preferably stand precisely perpendicular on one another.

The second reflection region is designed to reflect a different part of the incident light that falls on the retroreflection element, independent of the preferred direction, at an observation angle between 0° and 2°. The second reflection region ensures that the retroreflection element remains visible even perpendicular to the preferred direction at an observation angle up to at least 2°. For example, the second reflection region can even reflect light that proceeds from a headlight on the passenger side of a vehicle into the eye of a driver. For the triples of the second reflection region, deviations of the side surfaces by up to one degree from the right angle relative to one another are possible.

Production of the retroreflection element according to the invention can take place using injection molding, for example. Other production methods and forming methods are also conceivable, such as punching as a foil, for example. Accordingly, a suitable injection-molding mold has a mold cavity for a first reflection region, and a mold cavity for a second reflection region. The triples of the mold cavities are negatives of the triples of the reflection element. Accordingly, the mold cavity of the first reflection region is designed to produce triples that reflect light in a preferred direction. The mold cavity of the second reflection region is designed to produce triples having an angle distribution of the reflected light independent of a preferred axis.

According to one aspect of the present invention, the triples of the second reflection region are disposed on a curved surface. Preferably, the surface is curved spherically. As a result, a wide-angle nature can be improved both in the horizontal and in the vertical observation direction.

The curvature of the surface, however, should not be selected to be too great. A curvature radius that is between 100 and 300 times greater than a width across flats of the triples, in other words a distance between two peaks at which the three side surfaces of a triple intersect, has proven to be advantageous. A factor between 175 and 225 is particularly suitable. Furthermore, it is advantageous if the second reflection region has two sub-regions that are mirror images of one another in such a manner that the curvatures form a saddle at the mirror plane. The saddle can be described, for example, by a spherical segment divided into two halves, the two halves of which segment are switched in terms of sides. In other words, surface sections of two spheres having the same radius intersect at the saddle, and the center points of the spheres are offset relative to one another. The saddle preferably stands perpendicular on a parting plane between the first and the second reflection region.

By means of this design, asymmetries of an individual triple can be equalized. The asymmetries are caused by loss of the total reflection, and demonstrate themselves in a unilateral break-off line of the function of the reflection value as a function of the incident angle. Due to the saddle, at least part of the triples still has a reflection on the opposite side of the saddle.

It is furthermore advantageous for equalization of the asymmetry if the individual triples are also oriented with mirror symmetry relative to the mirror plane. The mirror-symmetry orientation of the triples can, if necessary, also be undertaken in the first reflection region, without impairing the desired reflection properties.

According to an advantageous embodiment of the invention, the width across flats of the triples in the second reflection region is smaller at least by a factor of 5 than a width across flats of the triples in the first reflection region. A factor of 10 is optimal, by which the two widths across flats are differentiated. For example, the triples of the first reflection region have a width across flats of 2 mm to 3 mm, and the triples of the second reflection region have a width across flats between 200 μm to 300 μm. Small triple sizes of course tend to produce broader scattering of the incident light than large triples, for example due to refraction effects. For this reason, small triples support broad-angle distribution in the second reflection region.

Triples having a width across flats between 200 μm and 300 μm can be produced, for example, in that each triple is cut separately out of solid material for the mold cavity of the injection-molding mold for the second reflection region. In the first reflection region, scattering of small triples is undesirable; therefore widths across flats in the millimeter range are advantageous for this purpose.

Based on the design, small triples in the second reflection region additionally have the advantage that curvature of the surface has no effect on the thickness of the retroreflector element, because the spatial expanse of the triples of the first reflection region is greater along an optical axis than the height difference between the base surface of the second reflection region caused by the curvature, plus the spatial expanse of the triples of the second reflection region.

For a better optical overall impression of a retroreflection element according to the invention, it has proven to be advantageous if the structure of the second reflection region is doubly present at two opposite sides of the first reflection region. In other words, the structure has a third reflection region, which is disposed on a side of the first reflection region that lies opposite the second reflection region. The structure of the third reflection region is a mirror image of the structure of the second reflection region. The mirror plane runs parallel to the boundary surface of the first with the second reflection region, through the center of the first reflection region.

Suitable materials for use for retroreflector elements in road traffic are polymethyl methacrylate (PMMA) and polycarbonate (PC). These plastics can be colorless, for example, or be dyed with orange, reddish or other color tones usual in road traffic. It is understood that the structures can vary, depending on the color used, for example by analogy to the color factors used in EN 12899:3-2007.

Preferably, a surface content of the second reflection region is smaller by a factor between 3 and 10 than a surface content of the first reflection region. As a result, most of the light impacts the triples of the first reflection region, and is radiated back at a tight angle perpendicular to the preferred direction. If the surface content of the first reflection region amounts to more than 95% of the total reflective surface, the narrow angle distribution of the first reflection region dominates, and the wide-angle nature, according to the invention, of the second reflection region is lost.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
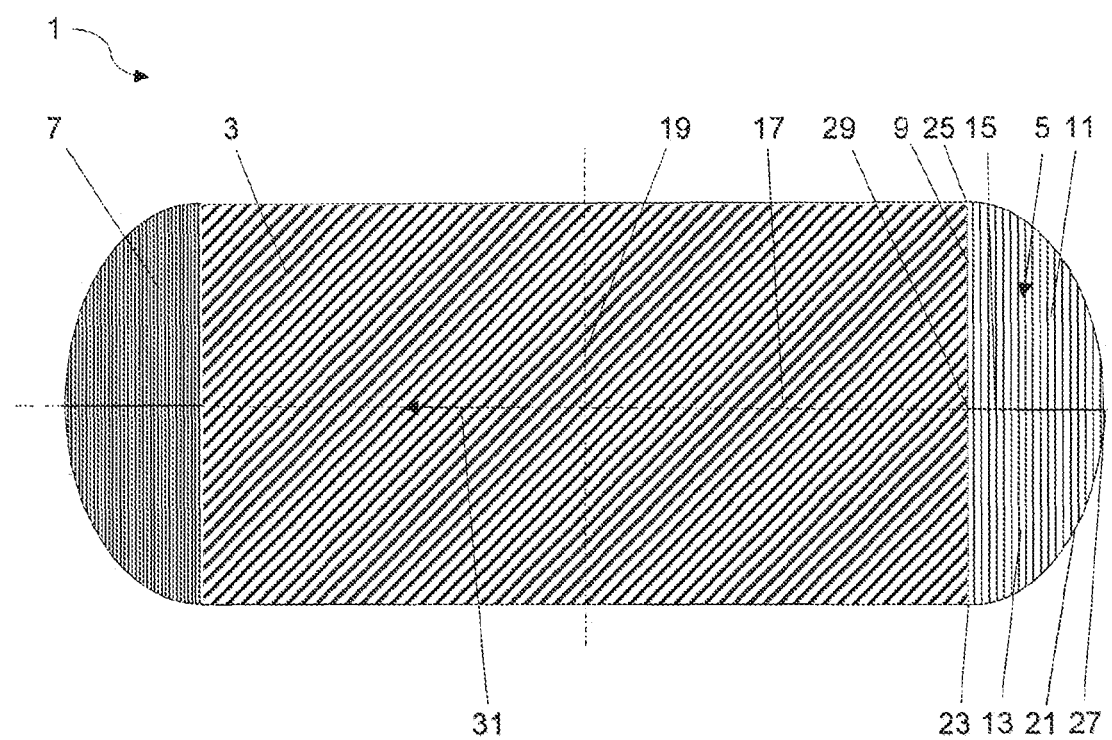
FIG. 1 shows an exemplary division of a retroreflector element according to the invention.

In FIG. 1, an exemplary division of a retroreflector element 1 according to the invention into a first reflection region 3, a second reflection region 5, and a third reflection region 7 is shown. Representation of the individual triples and of the curvature of the surface in the second and third reflection region 5, 7 was waived. A preferred direction 31 of the reflected radiation runs in a main expanse direction of the retroreflector element 1. Because a light source and a receiver, namely a headlight and an eye of a driver, are frequently disposed offset approximately vertically from one another in road traffic, in the following only the two orientations of the main expanse axis in the vertical and horizontal direction are of interest. In the case of a vertical orientation, observation therefore takes place parallel to the preferred direction; in the case of a horizontal orientation, this occurs perpendicular to this direction.

The second reflection region 5 is divided into a first sub-region 11 and a second sub-region 13. The two sub-regions 11, 13 are divided by a first mirror plane or plane of symmetry 17. The saddle 15 lies in this plane of symmetry 17. This plane of symmetry stands perpendicular on a boundary surface 9 between the first reflection region 3 and the second reflection region 5.

If one follows the curved surface of the second reflection region 5 along the boundary surface 9, then a height profile rises from a first edge point 23 to the saddle 15, along a first arc, and drops from the saddle 15 to an opposite second edge point 25, along a second arc, with mirror symmetry relative to the first arc. The height profile along the saddle 15 also follows a third arc. In this regard, an intersection point 29 between the saddle 15 and the boundary surface 9 is the highest point, and a third edge point 27 on the end of the saddle 15 that faces away from the boundary surface 9 is the lowest point. The radii of the circles assigned to the three arcs are of equal size. If the distances between the first edge point 23 and the intersection point 29, the second edge point 25 and the intersection point 29, as well as the third edge point 27 and the intersection point 29 are the same, for example if the complete edge 21 of the retroreflection element 1 is configured in the shape of a semi-circle in the second reflection region 5, then the edge points 23, 25, 27 lie at the same height level. Here, height is understood to mean the distance of a point on the surface from a light entry surface (not shown) of the retroreflection element 1, which surface runs parallel to the plane of the drawing of FIG. 1.

The third reflection region 7 is situated on a side of the first reflection region 3 that lies opposite the second reflection region 5. The structure of the third reflection region 7 demonstrates mirror symmetry relative to the structure of the second reflection region 5. The mirror plane or plane of symmetry 19 runs through the center of the first reflection region 3. Accordingly, the surface is also curved in the third reflection region 7.

Figure 2:
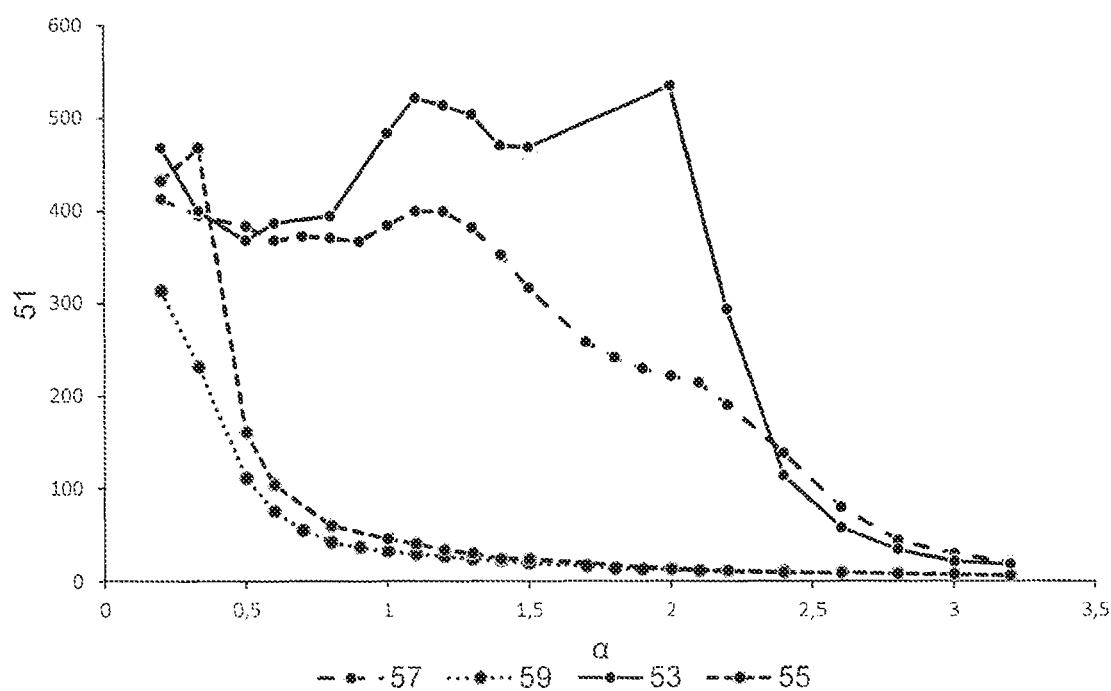
FIG. 2 shows exemplary reflection curves of the entire retroreflector element from FIG. 1.
Figure 3:
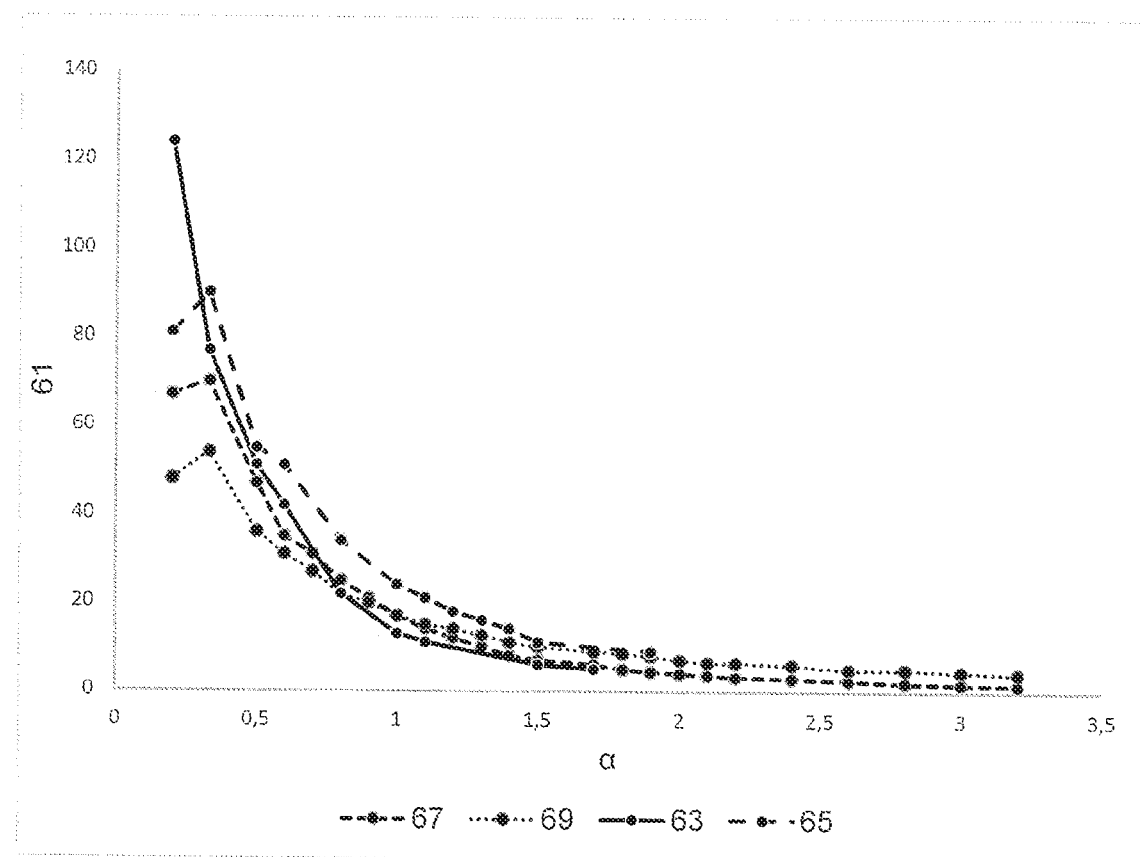
FIG. 3 shows exemplary reflection curves of the first reflection region in the case of a covered first reflection region.

FIGS. 2 and 3 show reflection curves, in other words reflection values 51, 61 of different retroreflection elements according to the invention, plotted above the observation angle $\alpha$. The reflection values 51, 61 are indicated in mCd/lux; the observation angle $\alpha$ is indicated in degrees. The measurement was carried out at an illumination angle (definition according to DIN 57520) $\beta v$ of 5° and $\beta h$ of 0°. In this regard, the reflection value of the entire retroreflection element 1 is shown in FIG. 2. In FIG. 3, the reflection value 61 of the second reclection region 5 and third reflection region 7 is shown. The first reflection region 3 was covered. The reflection value of the first reflection region can be determined by calculations, based on the difference of the values from FIG. 2 and FIG. 3.

In FIGS. 2 and 3, the reflection values 51, 61 of a transparent element are plotted in a vertical orientation 53, 63 and in a horizontal orientation 55, 65, as are those of an orange element made of PC in a vertical orientation 57, 67 and in a horizontal orientation 59, 69. It is shown that the first reflection region 3 yields a high reflection value for a very narrow angle range up to 0.5° in the case of a horizontal orientation, and then drops rapidly. In the case of a vertical orientation, the reflection value remains within a band between 75% and 100% of a maximal value, up to an observation angle of at least 1.5°. The second reflection region 5 and the third reflection region 7 contribute to the visibility of the retroreflection elements 1 at a lower reflection value, which is, however, achieved over a broad observation angle both in the case of a vertical orientation and in the case of a horizontal orientation. They ensure that the retroreflection element 1 remains visible even in the near range, in other words at a distance of a vehicle a few meters in front of the retroreflection element 1.

Although only a few embodiments of the present invention have been shown and described, it is to be understood that many changes and modifications may be made thereunto without departing from the spirit and scope of the invention.

What is claimed is:

1. A retroreflector element for use in road traffic comprising:
   an arrangement comprising a plurality of triples, each triple having first, second, and third side surfaces perpendicular to each other;
   wherein the retroreflector element has a preferred direction, a first reflection region, and a second reflection region;
   wherein the first reflection region is designed for reflecting an incident beam at an observation angle between 0.3° and 1.8° when the preferred direction is oriented, with regard to an emitter that emits a beam and a receiver that receives the beam retroreflected by the retroreflector element, in such a manner that a projection of a straight line that connects an emitter center point of the emitter with a receiver center point of the receiver onto a light entry surface of the retroreflector element is parallel to the preferred direction;

wherein the second reflector region is designed for reflecting the incident beam at an observation angle between 0.5° and 2° when the preferred direction is oriented, with regard to the emitter and the receiver, in such a manner that the projection of the straight line that connects the emitter center point of the emitter with the receiver center point of the receiver onto the light entry surface of the retroreflector is perpendicular to the preferred direction; and wherein a width across flats of the triples in the second reflection region is smaller by at least a factor of 5 than a width across flats of the triples in the first reflection region.

2. The retroreflector element according to claim 1, wherein the triples of the second reflection region are disposed on a curved surface.

3. The retroreflector element according to claim 2, wherein the curved surface is a spherically curved surface.

4. The retroreflector element according to claim 2, wherein the surface of the second reflection region has a radius of curvature that is greater by a factor between 100 and 300 than a width across flats of the triples of the second reflection region.

5. The retroreflector element according to claim 4, wherein the radius of curvature is greater by a factor between 175 and 225.

6. The retroreflector element according to claim 2, wherein the second reflection region has first and second sub-regions, wherein the first and second sub-regions are mirror images of one another with reference to a mirror plane in such a manner that curvatures at the mirror plane form a saddle.

7. The retroreflector element according to claim 1, wherein a width across flats of the triples in the second reflection region is smaller by at least a factor of 10 than a width across flats of the triples in the first reflection region.

8. The retroreflector element according to claim 6, wherein the retroreflector element has a third reflection region disposed on a side of the first reflection region that lies opposite the second reflection region.

9. The retroreflector element according to claim 8, wherein a structure of the third reflection region is a mirror image of a structure of the second reflection region with reference to a further mirror plane, wherein the further mirror plane runs parallel to a boundary surface of the first reflection region with the second reflection region.

10. The retroreflector element according to claim 1, wherein the retroreflector element comprises one of the materials polymethyl methacrylate or polycarbonate.

11. The retroreflector element according to claim 1, wherein the retroreflector element is dyed to be colorless, red or orange.

12. An injection-molding mold configured to produce the retroreflector element according to claim 1, wherein the injection-molding comprises a first mold cavity with a negative mold for the first reflection region and a second mold cavity with a negative mold for the second reflection region.

13. The injection-molding mold according to claim 12, wherein the first mold cavity for the first reflection region is produced using plates that are pushed toward one another or using a strand-shaped material or using galvanic molding of a master produced using plates, a strand-shaped material, or galvanic molding.

14. The injection-molding mold according to claim 12, wherein the second mold cavity for the second reflection region is produced by micro-cutting or by galvanic molding of a micro-section, wherein each of the triples is separately worked from solid material by micro-cutting.

* * * * *